US009807575B2

(12) United States Patent
Smadi

(10) Patent No.: US 9,807,575 B2
(45) Date of Patent: Oct. 31, 2017

(54) SYSTEM AND METHOD FOR FORMING ELECTRONIC GROUPS

(71) Applicant: BlackBerry Limited, Waterloo (CA)

(72) Inventor: Mohammed Nawaf Smadi, Ancaster (CA)

(73) Assignee: BlackBerry Limited, Waterloo, Ontario (CA)

( * ) Notice: Subject to any disclaimer, the term of this patent is extended or adjusted under 35 U.S.C. 154(b) by 438 days.

(21) Appl. No.: 13/667,870

(22) Filed: Nov. 2, 2012

(65) Prior Publication Data

US 2014/0129626 A1    May 8, 2014

(51) Int. Cl.
G06F 15/16 (2006.01)
H04W 4/08 (2009.01)
H04W 4/02 (2009.01)

(52) U.S. Cl.
CPC ............ *H04W 4/08* (2013.01); *H04W 4/023* (2013.01)

(58) Field of Classification Search
CPC ..... H04L 67/22; H04L 65/403; H04L 67/306; H04L 51/32; H04L 12/588; H04L 12/18; H04L 51/04; H04L 67/18; H04L 51/20; H04L 12/1845; H04W 4/08; H04W 4/206; H04W 8/005; G06Q 50/01; G06Q 30/0261; G06Q 30/0269
USPC ......................................................... 709/204
See application file for complete search history.

(56) References Cited

U.S. PATENT DOCUMENTS 7,613,472 B2 * 11/2009 Northcutt ...................... 455/466
7,840,224 B2    11/2010 Vengroff et al.
7,925,289 B2    4/2011  David
2003/0083046 A1 5/2003 Mathis
2003/0126137 A1* 7/2003 McFadden ........ G06F 17/30604
2005/0097316 A1* 5/2005 Kim ...................... H04L 9/3255
                                                    713/163
2005/0159144 A1* 7/2005 Hager .................. H04M 3/5322
                                                    455/416
2005/0233776 A1 10/2005 Allen et al.
2007/0281689 A1 12/2007 Altman et al.
2008/0031203 A1  2/2008 Bill
(Continued)

FOREIGN PATENT DOCUMENTS

EP    1587332 A1    10/2005
EP    1860822 A1    1/2007
(Continued)

OTHER PUBLICATIONS

Urbiflock [ Ambient-Oriented Programming]; Oct. 29, 2010; retrieved online May 4, 2012 from http://soft.vub.ac.be/amop/at/urbiflock.

(Continued)

*Primary Examiner* — Douglas Blair
*Assistant Examiner* — Imran Moorad
(74) *Attorney, Agent, or Firm* — Fleit Gibbons Gutman Bongini Bianco PL; Thomas S. Grzesik

(57) ABSTRACT

Methods, computer readable media, and electronic devices are provided for forming an electronic group by determining that a plurality of electronic devices satisfy at least one proximity criterion; determining a plurality of candidate members for the electronic group according to contact list information for at least one of the plurality of electronic devices; and forming the electronic group from the plurality of candidate members.

19 Claims, 10 Drawing Sheets

(56) References Cited

U.S. PATENT DOCUMENTS

| | | |
|---|---|---|
| 2008/0082420 A1 | 4/2008 | Kargman et al. |
| 2009/0186605 A1 | 7/2009 | Apfel et al. |
| 2009/0233639 A1 | 9/2009 | Watson et al. |
| 2009/0292549 A1* | 11/2009 | Ma et al. .......................... 705/1 |
| 2010/0070758 A1 | 3/2010 | Low et al. |
| 2010/0153284 A1* | 6/2010 | Hoag et al. ................... 705/319 |
| 2010/0317392 A1 | 12/2010 | Davis et al. |
| 2011/0066743 A1* | 3/2011 | Hurley .................... H04W 4/02 709/231 |
| 2011/0302245 A1* | 12/2011 | Li ......................... H04W 8/186 709/204 |
| 2012/0008526 A1 | 1/2012 | Borghei |
| 2012/0221639 A1 | 8/2012 | Mallet et al. |
| 2012/0311052 A1* | 12/2012 | Lee ..................... H04L 12/6418 709/206 |
| 2013/0046770 A1* | 2/2013 | Tseng ................ G06F 17/30867 707/748 |
| 2014/0012926 A1* | 1/2014 | Narayanan ............. G06Q 50/01 709/206 |
| 2014/0047023 A1* | 2/2014 | Baldwin ................ G06Q 10/10 709/204 |
| 2014/0047045 A1* | 2/2014 | Baldwin ............... H04L 67/306 709/206 |

FOREIGN PATENT DOCUMENTS

| | | |
|---|---|---|
| EP | 2242235 A1 | 10/2010 |
| WO | WO 03/020051 A1 | 4/2003 |
| WO | WO 2010/038139 A1 | 4/2010 |
| WO | WO 2010/144851 A2 | 12/2010 |

OTHER PUBLICATIONS

Jones Q. et al.; "P3 Systems : Putting the Place Back into Social Networks"; IEEE Internet Computing; Sep. 2005; vol. 9, Issue 5; pp. 38 to 46; IEEE Computer Society.

Losseau, D.; Search Report from corresponding European Application No. 12191054.1; search completed Apr. 22, 2013.

* cited by examiner

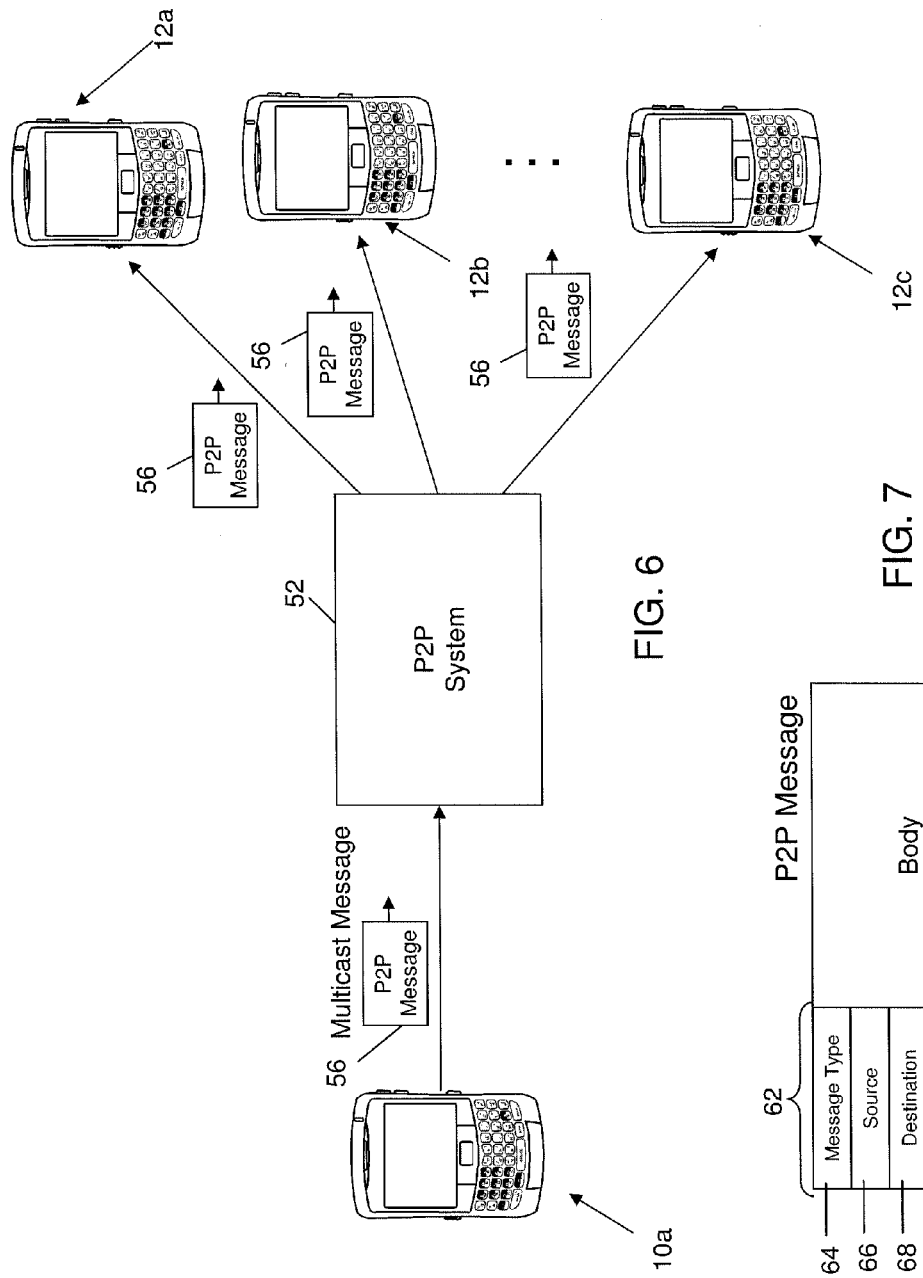

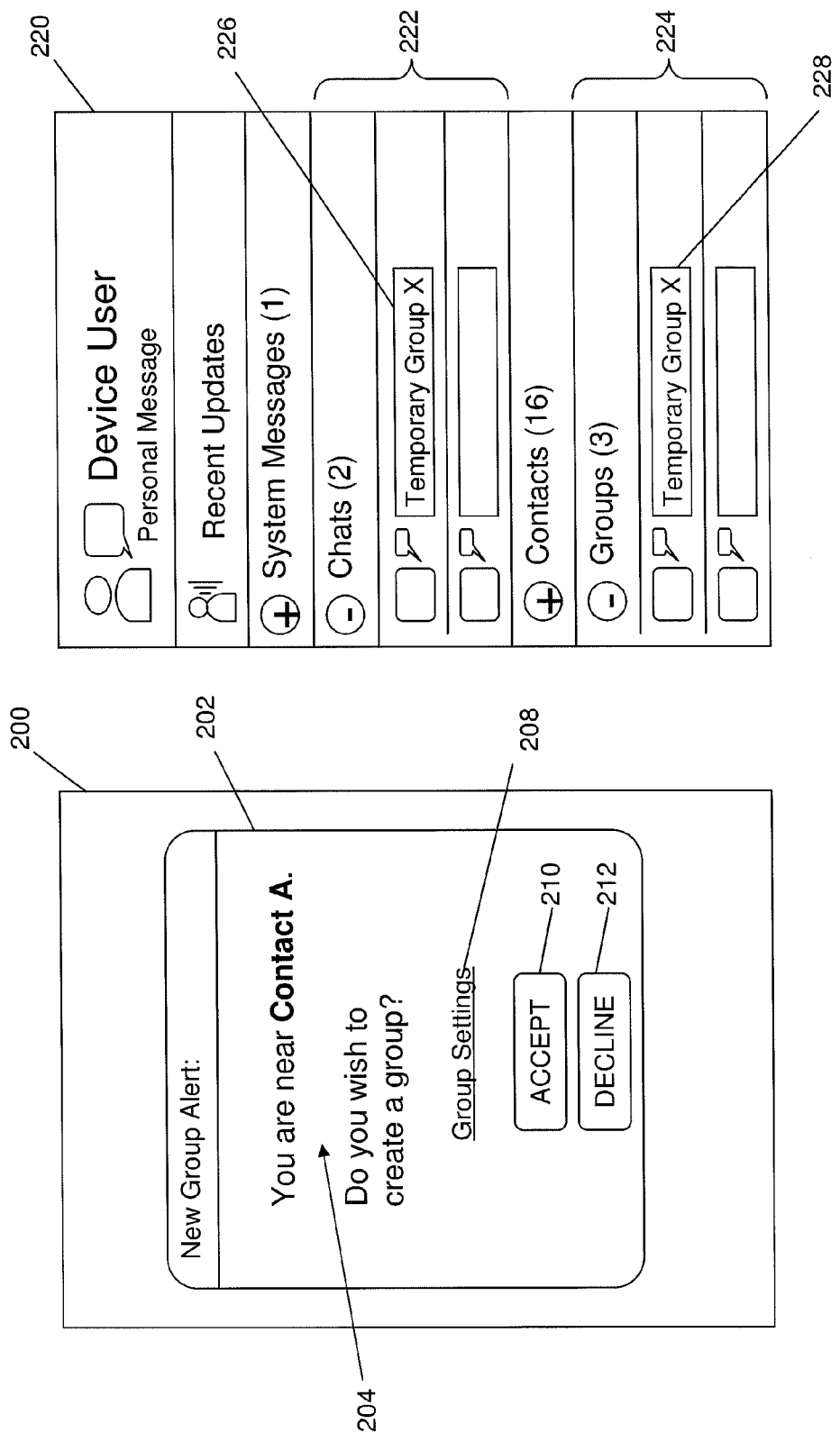

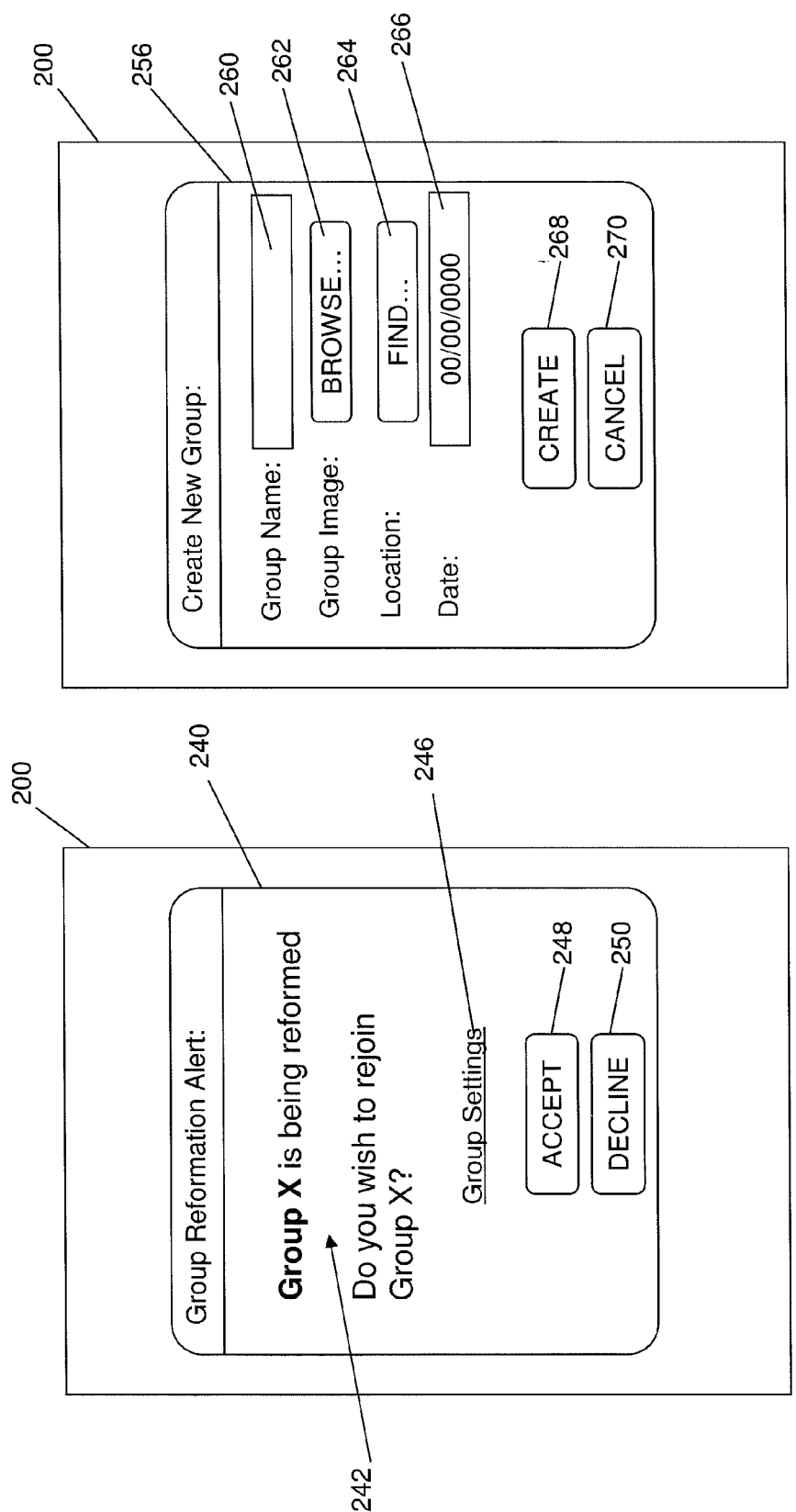

SYSTEM AND METHOD FOR FORMING ELECTRONIC GROUPS

TECHNICAL FIELD

The following relates to systems and methods for forming electronic groups.

DESCRIPTION OF THE RELATED ART

Electronic communication devices such as smart phones, laptop computers, tablet computers, portable gaming devices, in-vehicle navigation systems, etc, may include an application or have an embedded functionality for communicating in electronic groups, i.e., groups of a plurality of electronic devices associated with particular users, identities or entities.

The creation of a new electronic group, and the addition of new members to an existing electronic group may require numerous interactions and interventions, e.g., to prepare invitations, set permissions, seek out addresses or other identifiers, etc. These interactions and interventions can be particularly burdensome when forming a group with members that are not already part of an existing contact list or otherwise known to the group creator. Moreover, electronic groups may require additional administrative input, e.g., where related groups have overlapping members that need to be resolved, and/or where electronic groups allow members to join and leave at different points in time.

BRIEF DESCRIPTION OF THE DRAWINGS

Embodiments will now be described by way of example only with reference to the appended drawings wherein:

FIG. 6 is a schematic illustration of an example multi-cast message delivery in a peer-to-peer communication system;

FIG. 7 is a schematic illustration of an example peer-to-peer message;

FIG. 9 is an example of a screen shot illustrating a group formation prompt;

FIG. 10 is an example of a screen shot illustrating an instant messaging list view;

FIG. 11 is an example of a screen shot illustrating a group reformation prompt;

FIG. 12 is an example of a screen shot illustrating a create new group view.

DETAILED DESCRIPTION

Figure 1:
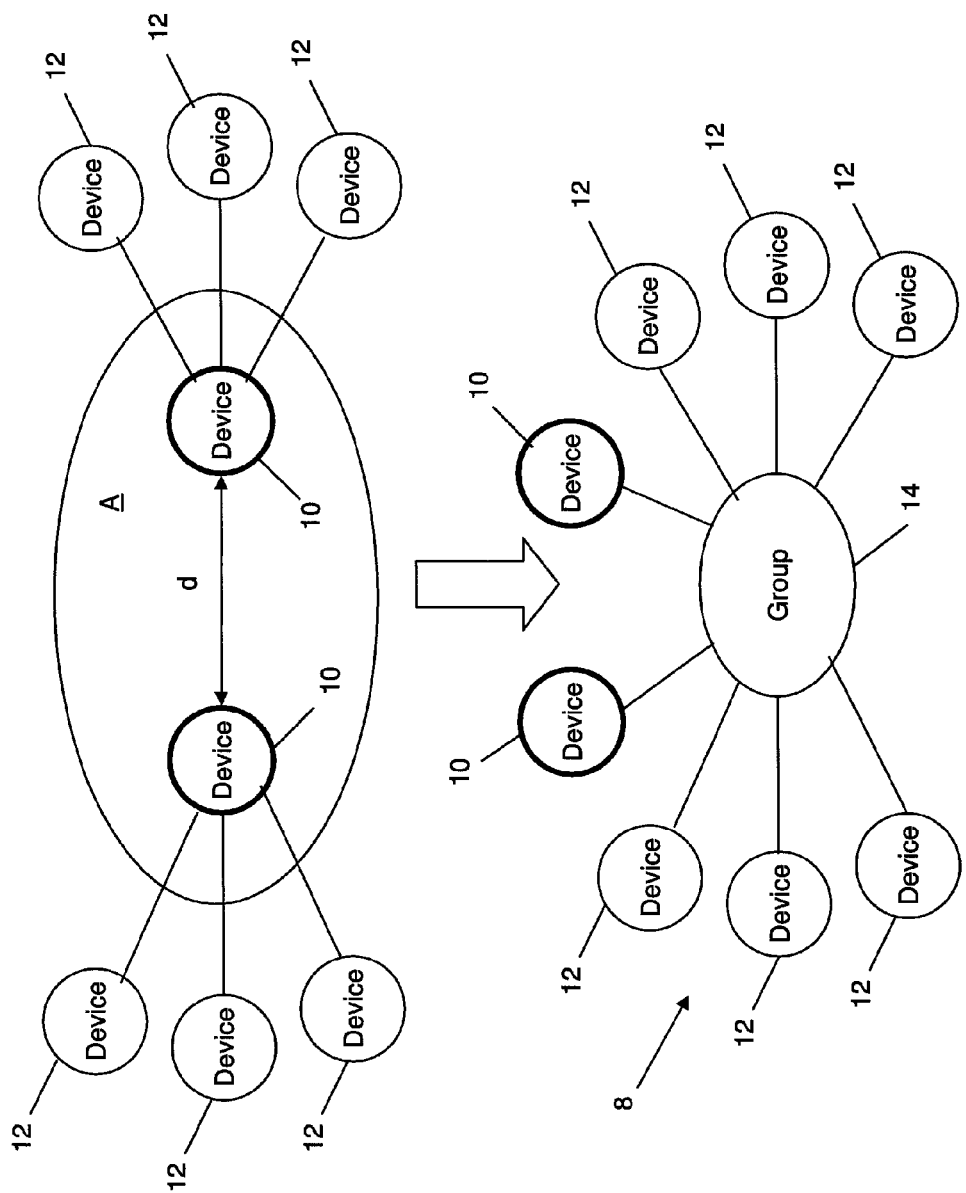
FIG. 1 is a schematic illustration of a group formation based on contact devices associated with proximate devices.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

To facilitate dynamic and temporary or otherwise short term electronic group formation, location information related to at least two electronic devices and contact list information from each of the electronic devices may be used. The location information may include absolute location information or relative location information to identify "proximate" electronic devices that are candidates for forming a group. The contact list information may be used to dynamically include "contact" electronic devices in the group. Various other additional criteria may also be applied to refine the group membership to include or exclude particular contacts according to such criteria.

Additionally, it has been found that existing electronic groups, as well as electronic groups to be formed, can be given or otherwise have a signature identifying the group and location and/or temporal information for the group. The signature may be used to detect appropriate new members, initiate the creation of a group, reform a previously existing group, etc.

For the sake of brevity, in the following discussion, the term "group" may be used interchangeably with "electronic group".

Turning now to the figures, FIG. 1 illustrates an example of a group communication system 8 that is formed based on location information associated with at least a pair of proximate devices 10, and based on contact devices 12 associated with the proximate devices 10. The proximate devices 10 in this example are devices that, based on an absolute or a relative location of each device, are proximate, in a similarly defined location, or otherwise near each other. In FIG. 1, a measure of distance d may be used to determine relative proximity, and a measure of area A may be used to determine absolute proximity, i.e., whether or not the proximate devices 10 are within a specified or otherwise predetermined zone, area, region, etc.

The contact devices 12 in this example are devices that are associated with contacts (e.g., address book entries, messaging "buddies", social networking "friends", etc.) that are stored or otherwise known to the respective proximate devices 10, whether or not the contact devices 12 also satisfy the proximity criteria. For example, the proximate devices 10 in the example shown in FIG. 1 may be friends that attend the same event and each have a set of contacts with which they will share photos from the event.

The proximate devices 10, when considered proximate, initiate the formation of a group 14 that includes both the proximate devices 10 and the contact devices 12. The group 14 is therefore formed in a dynamic manner based on location information and contact information of at least two proximate devices 10. It can be appreciated that the example shown in FIG. 1 is illustrative only and more or fewer total devices may be included in a dynamically formed group 14. It can also be appreciated that the group 14 may be temporarily formed, e.g., while the proximate devices 10 continue to be proximate, for a period of time, as manually specified, or as otherwise determined. The group 14 may also persist indefinitely until the group 14 is manually eliminated, e.g., by a group creator or administrator for the group 14.

Figure 2:
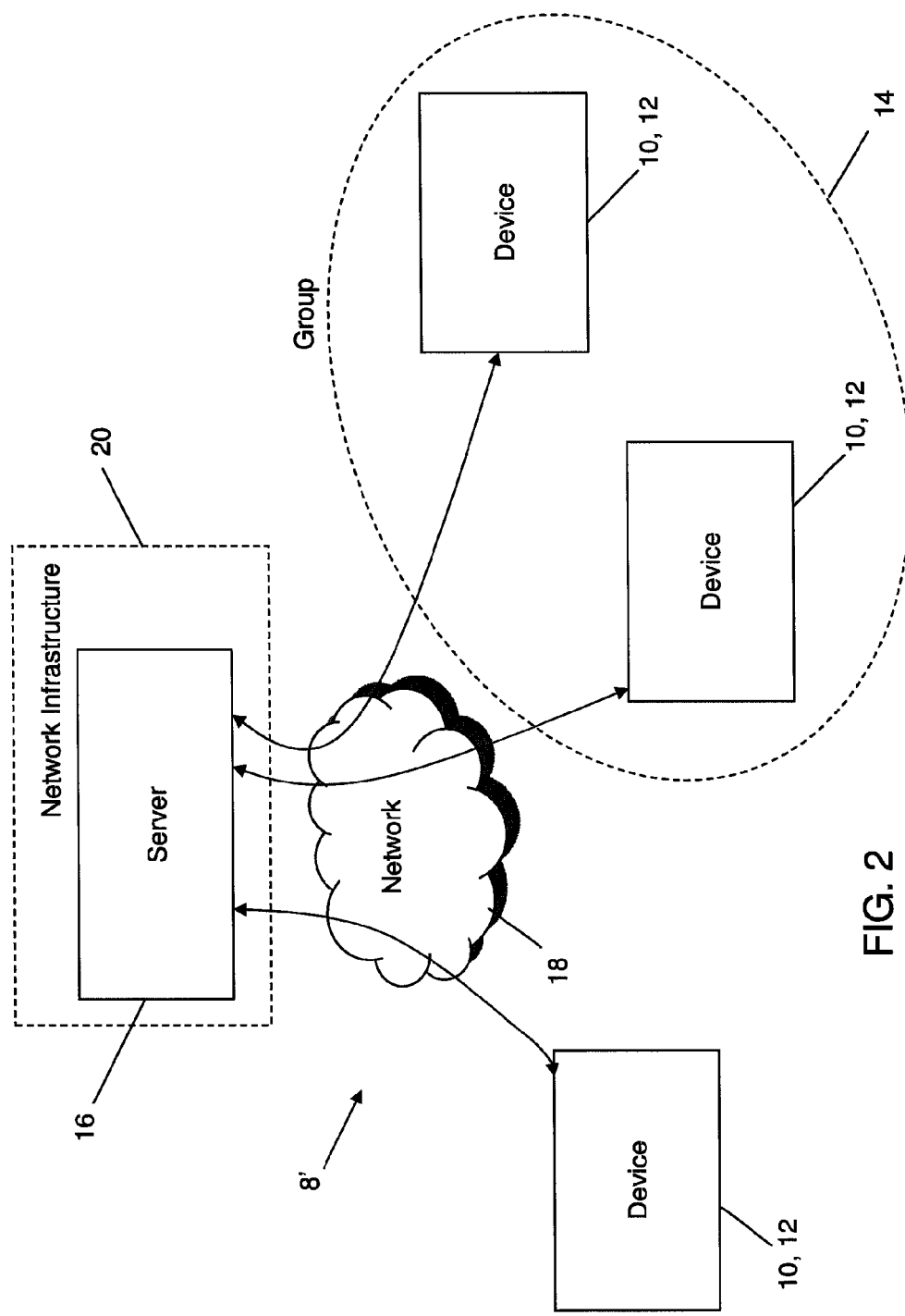
FIG. 2 is a schematic diagram of an example of a communication system for communicating in an electronic group.

FIG. 2 illustrates an example client/server group communication system 8', in which proximate and/or contact devices 10, 12 (as well as other devices not shown) communicate with each other via a server 16 by accessing a network 18. The server 16 in the example shown in FIG. 2 is part of or otherwise related to a network infrastructure 20 that is associated with or otherwise communicable with the network 18. It can be appreciated that although the devices 10, 12 may communicate with the server 16 via various interrelated or inter-communicable networks and the single network 18 shown in FIG. 2, this example is for illustrative purposes only. As illustrated in FIG. 2, any plurality of devices 10, 12 may form a group 14 that is capable of communicating among members using the communication system 8', network infrastructure 20, network 18, etc.

Figure 3:
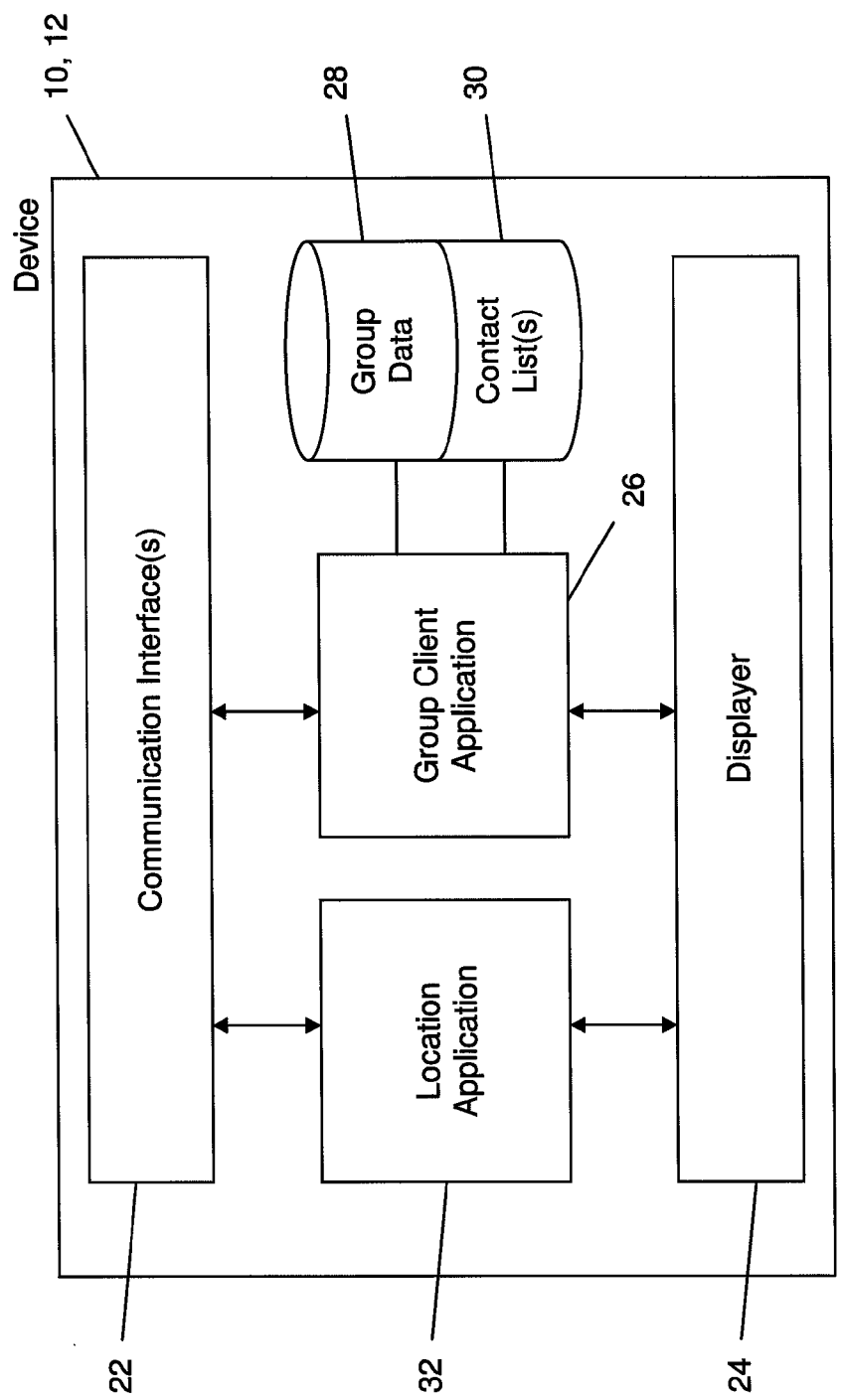
FIG. 3 is a block diagram of an example of a configuration for an electronic device.

FIG. 3 illustrates an example of a configuration for a proximate or contact device 10, 12 enabling participation in the group communication system(s) 8, 8' (e.g., as shown in FIGS. 1 and 2). The mobile device 10 in this example includes one or more communication interfaces 22. The communication interface(s) 22 may enable, for example, access to the network 18, as well as the ability to utilize short range communication protocols, etc. The device 10, 12 has a group client application 26 for participating in group-related communications. It can be appreciated that the group client application 26 may be a standalone application as shown in FIG. 3 or a group feature or functionality provided by another application, such as a P2P based messaging application, e.g., instant messaging. The group client application 26 includes or otherwise has access to one or more memory or storage elements for storing group data 28 and one or more contacts lists 30. It can be appreciated that the group data 28 may include any information or data related to the group communication system 8, 8', including, without limitation, copies of conversations or "chats", profiles, shared media items, etc. For example, profiles may be stored that include various user-selectable and/or definable settings such as availability, status message, picture, sharing options, etc.

The device 10, 12 also includes a location application 32 for obtaining and utilizing location information associated with the device 10, 12, e.g., GPS coordinates, cell-tower triangulation positioning, etc. The group client application 26 and location application 32 (among other applications, components, and software elements not shown in FIG. 3) may utilize a displayer 24 for rendering user interface elements on a display screen of the device 10. 12.

Figure 4:
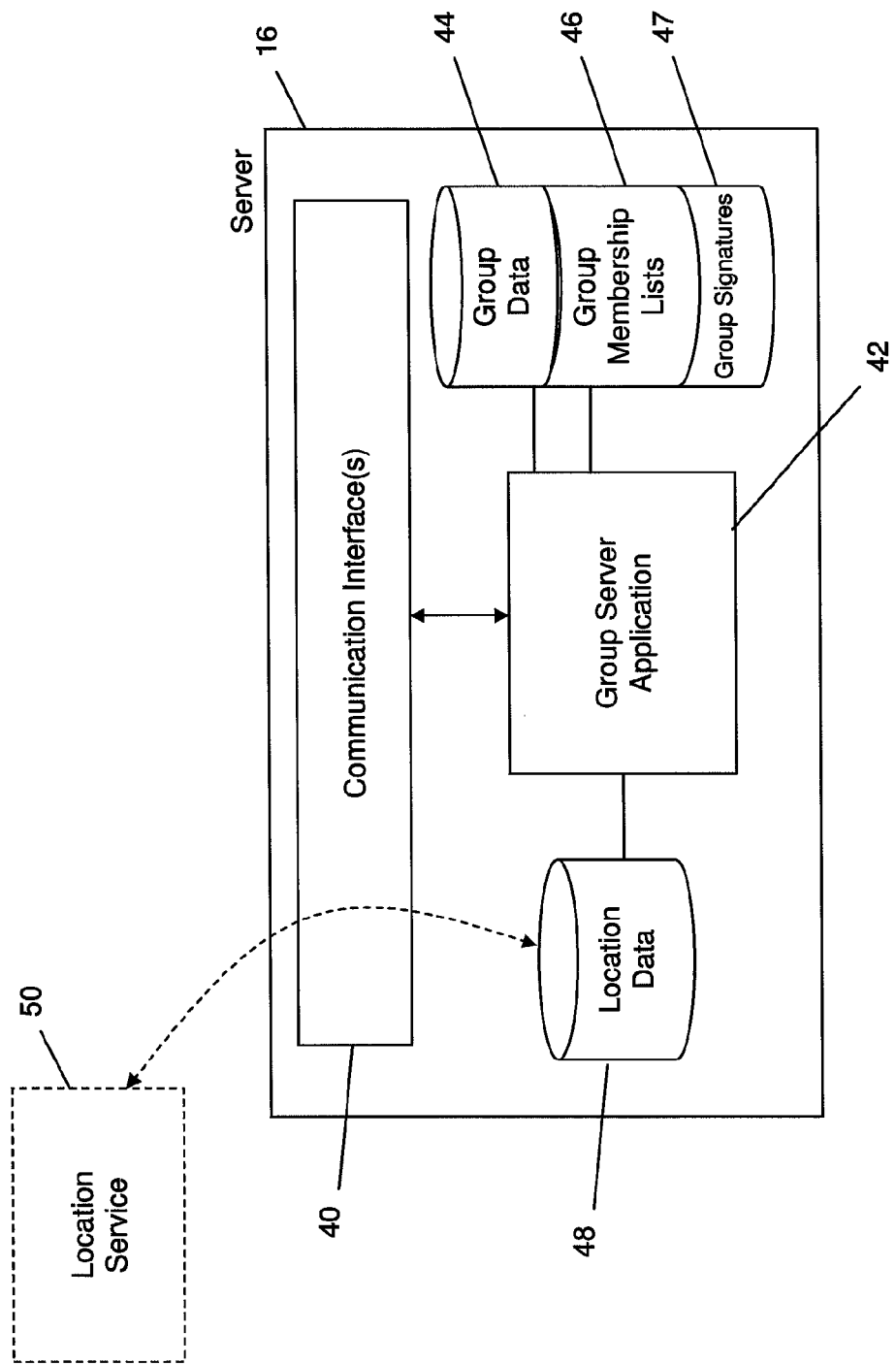
FIG. 4 is a block diagram of an example of a configuration for a server.

FIG. 4 illustrates an example of a configuration for a server 16 that enables devices 10, 12 to communicate in a group communication system 8, 8'. In this example, the server 16 includes, among other things not shown, one or more communication interfaces 40 to enable the server 16 to communicate with or be communicated with by devices 10, 12, other network infrastructure components, etc. The server 16 also includes a group server application 42 corresponding to the group client application 26 running on the devices 10, 12. The group server application 42 includes or otherwise has access to group data 44, e.g., for maintaining a server-based repository of the group data 28 stored by client devices 10, 12. For example, the group server application 42 may receive and update presence status changes provided by a particular device 10, 12 such that presence status updates can be distributed or otherwise communicated to other devices 10, 12 corresponding to contact list(s) 30 of that particular device 10, 12.

The group server application 42 also includes or otherwise has access to group membership lists 46, e.g., to maintain group memberships for groups being formed and reformed as discussed further below.

The group server application 42 also includes or otherwise has access to group signatures 47 that may be stored to enable groups 14 to be reformed and/or to detect whether or not particular devices 10, 12 exhibit at least one characteristic of a signature 47, thus indicating that the particular device 10, 12 could join a group 14 being formed or reformed. The signatures 47 may include, for example, time and location parameters (e.g., for an event), a network location identifier (e.g., WLAN SSID), the presence of a core group of proximate devices 10 being in proximity of each other, etc. The signature 47 may include various data structures including database entries, uniquely identifiable records (i.e. a collection of fields) in a database, a subset of the fields in database, etc. The signature 47 may also include a unique identifier that is the output of a identifier-generating function (e.g., a hash function) that takes as an input all or a subset of the fields of records and uses them to generate an identifier which, in turn, is compared against the identifier that was generated and stored at the first group formation instance. For example, an md5sum function may be used to generate a unique simplified one-way identifier that allows an entity having downloaded software running the md5sum function to compare, e.g., a 100 bit sequence that is unique and reproducible if run over the same data in the future.

The server 16 also includes or otherwise has access to location data 48 for devices 10, 12 communicating in the group communication system 8, 8'. The location data 48 may be determined by the server 16, from the network infrastructure 20 (e.g., if already known and maintained by the network infrastructure 20), or from a $3^{rd}$ party or otherwise external location service 50, as shown in dashed lines in FIG. 4.

Figure 5:
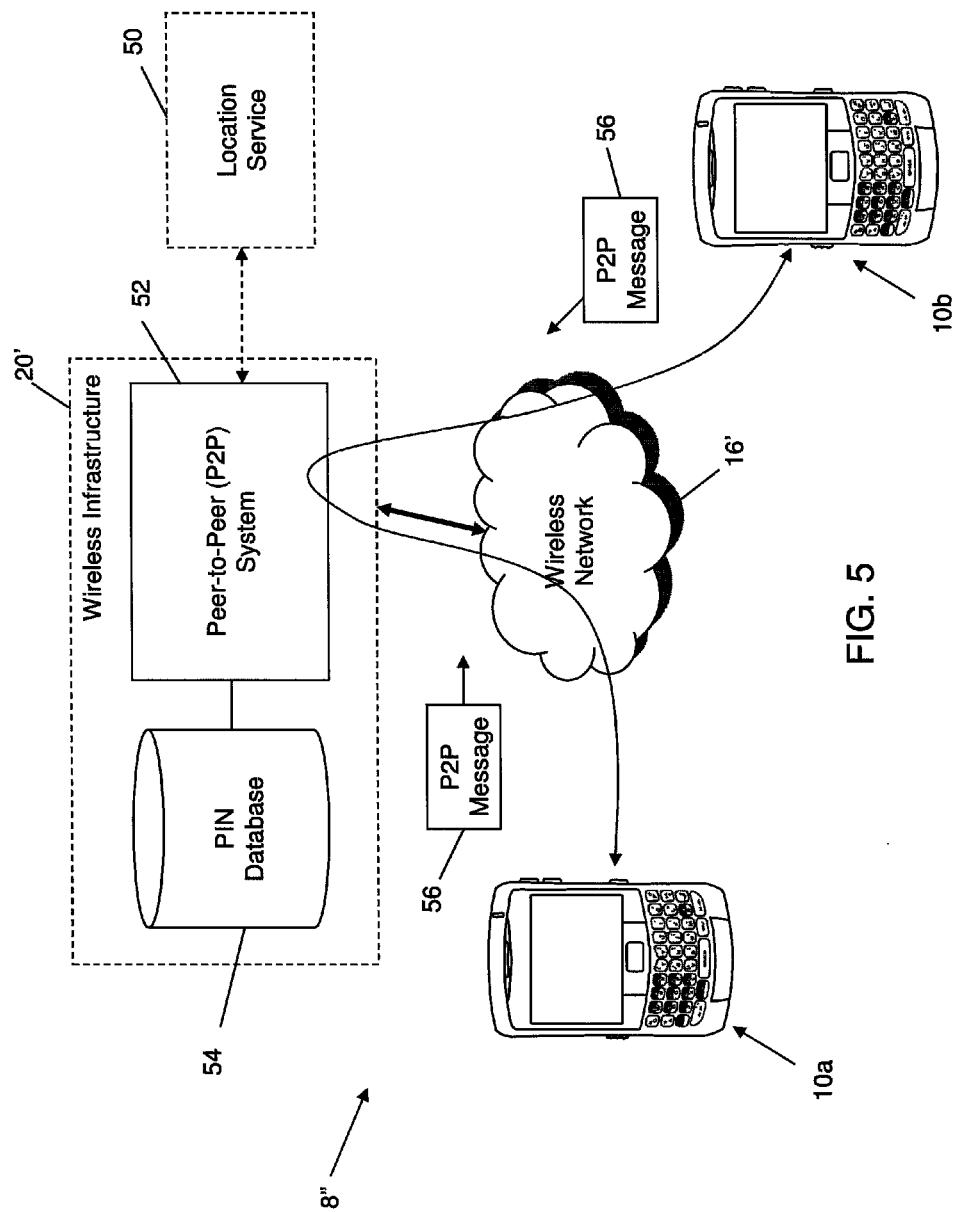
FIG. 5 is a is a schematic illustration of an example peer-to-peer communication system.

As discussed above, the group client application 26 may be incorporated into or otherwise provided by a P2P-based application and underlying system. An example of a P2P-based communication system 8" including a wireless infrastructure 20', is shown in FIG. 5. The communication system 8", at least in part, enables the proximate devices 10 and contact devices 12 to communicate via a peer-to-peer (P2P) system 52. In this example, the P2P system 52 is accessed by connecting to a wireless network 16'. The P2P system 52 enables, in some examples, proximate devices 10*a*, 10*b* to attempt group formation based either on inference or specific filters enabling the first proximate device 10*a* to access services had by the second proximate device 10*b*.

In the example shown in FIG. 5, a first proximate device 10*a* is shown communicating with a second proximate device 10*b*. The first and second proximate devices 10*a*, 10*b* are illustrated as being mobile devices such as smart phones. However, it can be appreciated that other types of electronic devices configured to conduct P2P messaging may also be capable of communicating with or within the communication system 8". It will also be appreciated that although the examples shown herein are directed to mobile communication devices, the same principles may apply to other devices capable of communicating with the P2P system 52. For example, an application (not shown) hosted by a desktop computer or other "non-portable" or "non-mobile" device may also be capable of communicating with other devices (e.g., including first and second proximate devices 10a, 10b) using the P2P system 52.

The P2P system 52 is, in this example, a component of the wireless infrastructure 20' associated with the wireless network 16'. The wireless infrastructure 20' in this example includes, in addition to the P2P system 52, and among other things not shown for simplicity, a person identification number (PIN) database 54. The PIN database 54 in this example is used to store one or more PINs associated with particular devices, whether they are subscribers to a service provided by the wireless infrastructure 20' or otherwise. To illustrate operation of the P2P system 52 with respect to FIGS. 5 to 7, the first and second proximate devices 10a, 10b will be referred to commonly as "mobile devices 10".

One of the mobile devices 10 may communicate with the other of the mobile devices 10 and vice versa via the P2P system 52, in order to perform P2P messaging or to otherwise exchange P2P-based communications. For ease of explanation, in the following examples, any P2P-based communication may also be referred to as a P2P message 56 as shown in FIG. 5.

In some examples, the P2P system 52 may be capable of sending multi-cast messages, i.e. forwarding a single message from a sender to multiple recipients without requiring multiple P2P messages 56 to be generated by such sender. For example, as shown in FIG. 6, the P2P system 52 can be operable to enable a single P2P message 56 to be sent by a first proximate device 10a to multiple recipient contact mobile devices 12a, 12b, and 12c, by addressing the P2P message 56 to multiple corresponding P2P addresses, and having the P2P system 52 multicast the P2P message 56 to those recipient contact mobile devices 12a, 12b, and 12c.

An example P2P message 56 is shown in greater detail in FIG. 7, and has a format that is particularly suitable for a PIN-to-PIN based system. In a typical P2P protocol, each P2P message 56 has associated therewith a source corresponding to the mobile device 10 which has sent the P2P message 56 and includes a destination identifying the one or more intended recipients. Each P2P message 56 in this example includes a body 60, which contains the content for the P2P message 56 (e.g., text or other data), and a header 62, which contains various fields used for transmitting and processing each P2P message 56. In this example, the header 62 includes a message type field 64 to specify the type of transmission (e.g., chat, registration, block, presence, sharing session etc.), a source field 66 to specify the device address for the sender, a destination field 68 to specify the device address(es) for the one or more intended recipients, an ID field 70 to identify the corresponding P2P application (e.g., see group client application 26 in FIG. 3) and a timestamp field 72 to indicate the time (and if desired, the date) at which the P2P message 56 was sent by the designated sender.

It can be appreciated that in this example, the ID field 70 can be used to specify the application ID to identify a P2P application on the mobile device 10. Where the P2P application relates to, for example, an IM system, the message type field 64 can also be used to designate an IM communication, and the ID field 70 may then correspond to a conversation ID, i.e. a conversation thread the P2P message 56 corresponds to (e.g., such that each P2P message 56 is identified by the conversation in which it was sent). The message type field 64 and the ID field 70 can therefore also be used to identify a sharing session, as will be explained in greater detail below.

It will be appreciated that other information or attributes may be included in the P2P message 56, such as a subject field (not shown) to enable a subject for part or all of a conversation (in an IM embodiment) to be transported with the P2P message 56 (e.g., to create new subjects, modify subjects, notify others of subjects, etc.), or application details field (not shown) to provide application-specific information such as the version and capabilities of the application.

The P2P system 52 can utilize any suitable P2P protocol operated by, for example, a P2P router (not shown), which may be part of the wireless infrastructure 20'. It can be appreciated, however, that a stand-alone P2P configuration (i.e. that does not rely on the wireless infrastructure 20'—not shown) may equally apply the principles herein. The P2P system 52 may also enable mobile devices 10 to communicate with desktop computers, thus facilitating, for example, communications such as instant messaging (IM) between mobile applications and desktop applications on the desktop computer.

The P2P system 52 can be implemented using a router-based communication infrastructure, such as one that provides email, Short Message Service (SMS), voice, Internet and other communications. Particularly suitable for hosting a P2P messaging router, is a wireless router or server used in systems such as those that provide push-based communication services. In FIG. 5, the wireless infrastructure 20' facilitates P2P communications such as instant messaging between mobile devices 10. P2P messaging, such as IMing, is provided by an associated application stored on each mobile device 10, e.g., an IM application, which can be initiated, for example, by highlighting and selecting an icon from a display as is well known in the art. The P2P system 52 routes messages between the mobile devices 10 according to the P2P protocol being used. For example, the P2P protocol may define a particular way in which to conduct IM or other types of messaging.

In general, in a P2P protocol, the sender of the P2P message 56 knows the source address of the intended recipient, e.g., a personal identification number, phone number, IP address, etc. Knowledge of the source address may be established when the two devices request to add each other to their respective contact or buddy lists. A particular mobile device 10 can communicate directly with various other mobile devices 10 through the P2P system 52 without requiring a dedicated server for facilitating communications. In other words, the P2P system 52 enables the mobile devices 10 to communicate with each other directly over the wireless infrastructure 20' in accordance with the P2P protocol.

When conducting a P2P session according to the example shown in FIG. 5, the mobile devices 10 can communicate directly with the wireless infrastructure 20' in a client based exchange where, as noted above, an intermediate server is not required. A P2P message 56 sent by one mobile device 10 is received by the wireless infrastructure 20', which obtains the source address for the intended recipient (or recipients) from information associated with the P2P message 56 (e.g., a data log) or from the P2P message 56 itself. Upon obtaining the recipient's address according to the P2P protocol, the wireless infrastructure 20' then routes the P2P message 56 to the recipient associated with the mobile device 10 having such address (or recipients having respective addresses). The wireless infrastructure 20' typically also provides a delivery confirmation to the original sender, which may or may not be displayed to the user. The destination device can also provide such delivery information. The wireless infrastructure 20' may be capable of routing P2P messages 56 reliably as well as being capable of holding onto the P2P messages 56 until they are successfully delivered. Alternatively, if delivery cannot be made after a certain timeout period, the wireless infrastructure 20' may provide a response indicating a failed delivery. The wireless infrastructure 20' may choose to expire or delete a P2P message 56 if a certain waiting period lapses.

As discussed above, to facilitate dynamic and temporary or otherwise short term electronic group formation, location information related to at least two electronic devices and contact list information from each of the electronic devices may be used. The location information may include absolute location information or relative location information to identify "proximate" electronic devices that are candidates for forming a group. The contact list information may be used to dynamically include "contact" electronic devices in the group. Various other additional criteria may also be applied to refine the group membership to include or exclude particular contacts according to such criteria.

Figure 8:
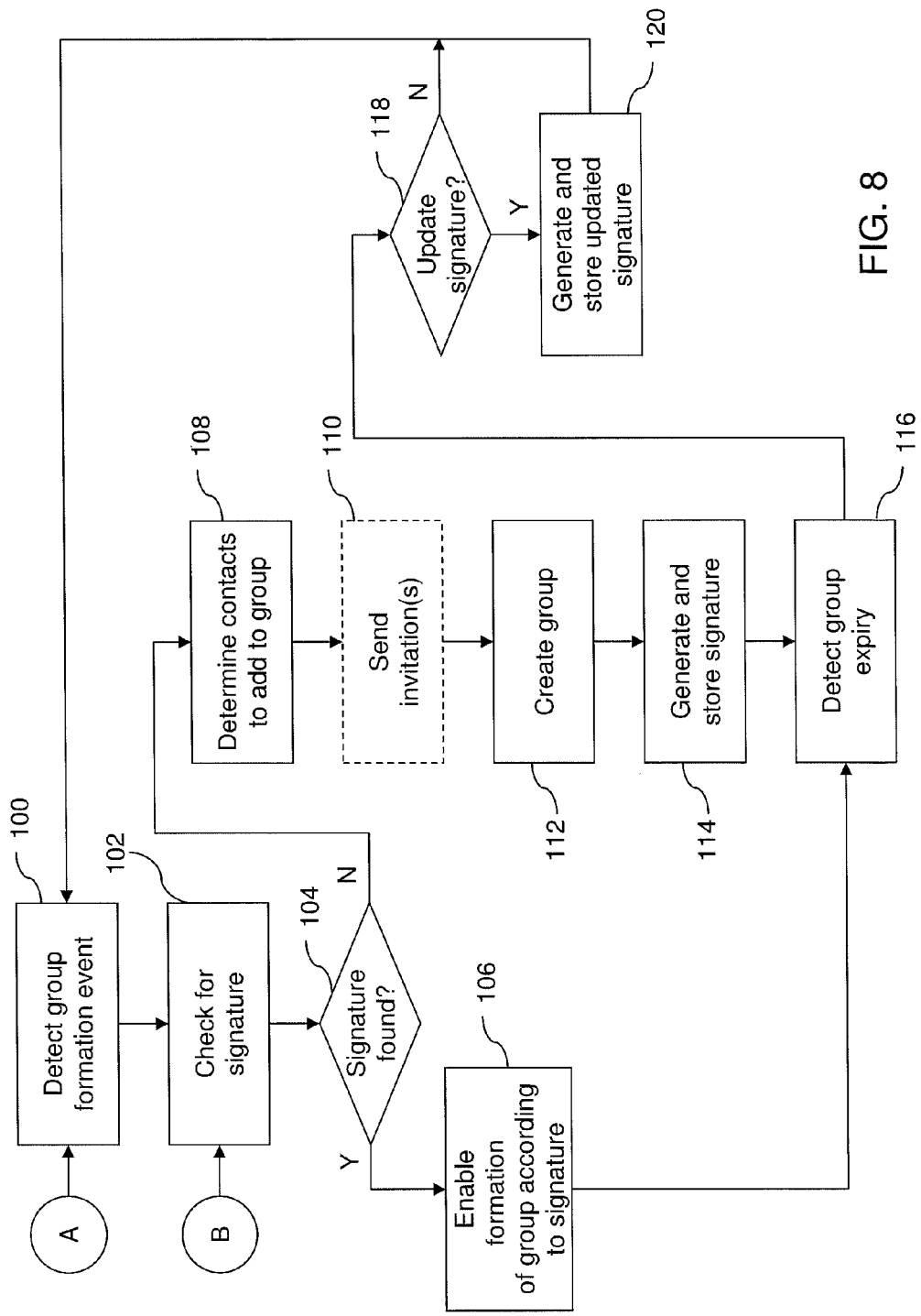
FIG. 8 is a flow chart illustrating example computer executable instructions that may be performed in forming and reforming electronic groups.

FIG. 8 illustrates example computer executable instructions that may be performed by the server 16, or a cooperation of one or more proximate devices 10 and the server 16, in forming and reforming groups 14. As shown in FIG. 8, the operations performed in forming and reforming the groups 14 may be initiated either according to detection of an event or according to another trigger, e.g., by detecting a group formation event, at 100; or to determine if a particular device 10, 12 exhibits a characteristic of a signature 47, e.g., by entering a predefined area A or by approaching a proximal distance d to a proximate device 10.

After initiating the process, at B, or detecting a group formation event, at 100, the group server application 42 checks for a signature 47, at 102. The group formation event detected, at 100, may include, for example, detection of a device 10, 12 entering an area A, a pair of proximate devices 10 approaching distance d, a periodic poll of predefined signatures 47 (e.g., created for a location and/or time period), etc. It can be appreciated that by checking for an existing signature 47 even when a group formation event is detected, at 100, the server 16 can enable the proximate device(s) 10 to reform a group 14 that has previously existed based on newly detected proximity criteria. For example, two proximate devices 10a, 10b associated with users attending a yearly conference may satisfy characteristics of a signature 47 for that event and, rather than create a new group 14 for the annual event, the same group 14 may be reformed and group data 48 brought forward for the reformed group 14.

Checking for signatures 47, at 102, also enables the group server application 42 to compare location and/or temporal information associated with a device 10, 12 to determine if that device 10, 12 could or should be added to a predefined (and to be formed) or existing group 14. In other words, it can be appreciated that the signatures can be queried both along with, and independent of, a group formation event.

The group server application 42 determines, at 104, whether or not a signature 47 has been found. For example, if two proximate devices 10a, 10b are detected within proximity area A and a signature 47 exists in connection with area A (e.g., a preplanned event location), the signature 47 can be used to form a new group 14 according to the signature 47 or reform a group 14 based on group information associated with the signature 47. If a signature 47 is found, at 104, the group server application 42 enables the formation of a group 14 according to the signature 47, at 106, e.g., by reforming a previously existing group 14 having that signature 47 or adding members to a new group 14 based on characteristics of the signature 47 (e.g., adding a member to an empty group 14 that has been arranged for a conference, concert, or other attraction or event).

Groups 14 may therefore be formed based on user-specified locations and/or times. For example, as discussed above, prior to an event in a particular geographic location that will occur for a particular duration of time, a user may request that the server 16 create a group 14 for the duration of time in connection with the geographic location. It can be appreciated that the user creating a group 14 to be formed in the future may not necessarily be a member of the group 14 and may represent an administrator or other entity. When the duration of time commences, the group server application 42 may use the location data 48 to determine devices 10, 12 in the geographic location that satisfy the proximity criteria and send invitations to those proximate devices 10 and, if applicable, contact devices 12 associated with the proximate devices 10. The contact devices 12 may be chosen in various ways, examples of which are provided below.

If a signature 47 is not found, at 104, a new group 14 may be formed based on the group formation event, e.g., based on detection of two proximate devices 10a, 10b being within a distance d from each other. For example, two proximate devices 10a, 10b attending the same attraction may be notified of the relative proximity and automatically, or based on user input, added to a new group 14 for the purpose of attendance at that attraction. The group server application 42 may therefore suggest the creation of a group 14 that includes the proximate devices 10 and other members that are associated with contacts of the proximate devices 10. For example, the union of all contact lists 30 of the proximate devices 10 may be used to create the group membership. Using the union of the contact lists 30 enables all contacts for the proximate devices 10 to share in the group experience related to the proximity of those proximate devices 10. For example, two users attending the same attraction may include their contacts in a group 14 to enable pictures shared by the two users to be shared among the contacts.

In another example, the intersection of the contact lists 30 of the proximate devices 10 may be used to generate the group membership. By using the intersection of the contact lists 30, only those contacts that are common to both users associated with the proximate devices 10 are included, at least during initial group formation.

It can be appreciated that various other criteria may be used instead of or in addition to the union or intersection of contact lists 30 in order to generate group membership. For example, a network domain may be used to include employees from the same organization (e.g., for attending a conference) can be used to exclude personal contacts. The network domain may also be used to exclude work contacts from a social group. Similarly, other identifiers may be used to include or exclude members, e.g., personal versus work contact designations.

The proximate devices 10 that satisfy the proximity criteria may be automatically added to the group 14, or may be prompted or otherwise notified of the group formation and be given an option to accept or decline inclusion in the group 14. Similarly, the contact devices 12 that are to be included in the group 14 may be automatically included or invited to join the group 14. As such, after determining the contacts to be added to the group 14, at 108, the group server application 42 may send invitations to the proximate devices 10 and/or contact devices 12, at 110. Prompts and invitations may be used to address potential security and/or privacy concerns by allowing devices 10, 12 to opt out of joining a group 14 being formed.

Assuming that at least a plurality of devices 10, 12 have been automatically added to the group 14, have accepted an invitation, or have replied positively to a prompt to join the group 14, the group 14 is created, at 112. A signature 47 for the group 14 is generated, at 114, to enable the group 14 to be reformed at a later time. It can be appreciated that a reformed group 14 can be constructed to include all of the devices 10, 12 in the original group 14 or a subset of the original group 14 who at the time of reformation continue to satisfy the proximity and/or contact list criteria initially specified. The reformed group 14 may also include new members not previously considered, e.g., if a proximate device 10 has added new contacts to a contact list 30 since the group 14 expired.

In the examples described herein, the dynamically formed groups 14 are considered temporary. It can be appreciated that any of the groups 14 being formed or reformed 14 may persist indefinitely, e.g., by detecting selection of a profile option or other user selection. In the example shown in FIG. 8, it is assumed that expiry of the group 14 is detected, at 116. The group server application 42, after detecting expiry of the group 14, determines, at 118, if the signature 47 for that group 14 should be updated. For example, original members of the group 14 may have opted to leave the group 14, new members may have been manually added, the location and/or time(s) associated with the group 14 may have changed, etc.

If the signature 47 is to be updated, an updated signature 47 is generated and stored by the group server application 42, at 120. As shown in FIG. 8, a group 14 reformed, at 106, may also persist until detecting expiry of the group 14, e.g., based on a temporary group duration or based on manual deletion of the group 14, e.g., by a group creator or administrator.

FIG. 9 is an example of a screen shot 200 illustrating a group formation prompt 202 providing a new group alert for a proximate device 10. The prompt 202 in this example includes an alert or notification 204 specifying that the proximate device 10 is near Contact A and requests permission to create a group 14. A group settings option 208 may be included in the prompt 202 to enable the user of the proximate device 10 to, for example, restrict information that is shared with the group being formed, set a time limit for the group 14, etc. An accept button 210 may be selected to accept entry into the group 14 being formed, or a decline button 212 may be selected to decline entry into the group 14.

FIG. 10 is an example of a screen shot illustrating an instant messaging list view 220. The list view 220 in this example includes, among other things, a list of chats 222 and a list of groups 224. The list of chats 222 includes an entry 226 for Temporary Group X that has been formed, e.g., according to the operations shown in FIG. 8. The list of groups 224 also includes an entry 228 for Temporary Group X. By incorporating the temporary groups formed according to proximity criteria and contact list information into the instant messaging list view 220, a convenient and familiar user interface can be used to conduct communications within the group communication system 8, 8', 8''.

FIG. 11 is an example of a screen shot 200 illustrating a group reformation prompt 240 providing a group reformation alert, similar to the prompt 202 shown in FIG. 9. The group reformation prompt 240 in this example includes a message 242 indicating that Group X is being reformed, e.g., due to temporal, geographic or other criteria, and invites the user of the device 10, 12 being alerted to rejoin Group X. An accept button 248 may be selected to rejoin the group 14 or a decline button 250 may be selected to decline entry into the reformed group. Similar to the prompt 202 discussed above, a group settings option 246 may be provided to enable settings associated with the reformed group 14 to be edited or specified.

FIG. 12 is an example of a screen shot 200 illustrating a create new group view 256. The create new group view 256 may be initiated by a user in order to characterize a group 14 prior to the group 14 being formed, e.g., prior to an upcoming event such as a conference, concert, sporting event, etc. The create new group view 256 enables a group name 260 to be specified, a group image or other icon or avatar to be associated with the group 14 by selecting a browse button 262, a location for satisfying the proximity criteria to be chosen or specified by selecting a find button 264, and a date 266 associated with the group 14 to be specified. It can be appreciated that specifying a date 266 may be an optional characteristic of the group 14 being created, and the time may include a single day, a duration of time (in days, weeks, months, years, etc.), and a commencement date after which the duration of time begins.

Accordingly, there is provided a method of forming an electronic group, the method comprising: determining that a plurality of electronic devices satisfy at least one proximity criterion; determining a plurality of candidate members for the electronic group according to contact list information for at least one of the plurality of electronic devices; and forming the electronic group from the plurality of candidate members.

There is also provided a computer readable storage medium comprising computer executable instructions for forming an electronic group, comprising instructions for: determining that a plurality of electronic devices satisfy at least one proximity criterion; determining a plurality of candidate members for the electronic group according to contact list information for at least one of the plurality of electronic devices; and forming the electronic group from the plurality of candidate members.

There is also provided an electronic device comprising a processor, and at least one memory, the memory comprising computer executable instructions for causing the processor to form an electronic group by executing instructions to: determine that a plurality of electronic devices satisfy at least one proximity criterion; determine a plurality of candidate members for the electronic group according to contact list information for at least one of the plurality of electronic devices; and form the electronic group from the plurality of candidate members.

Figure 13:
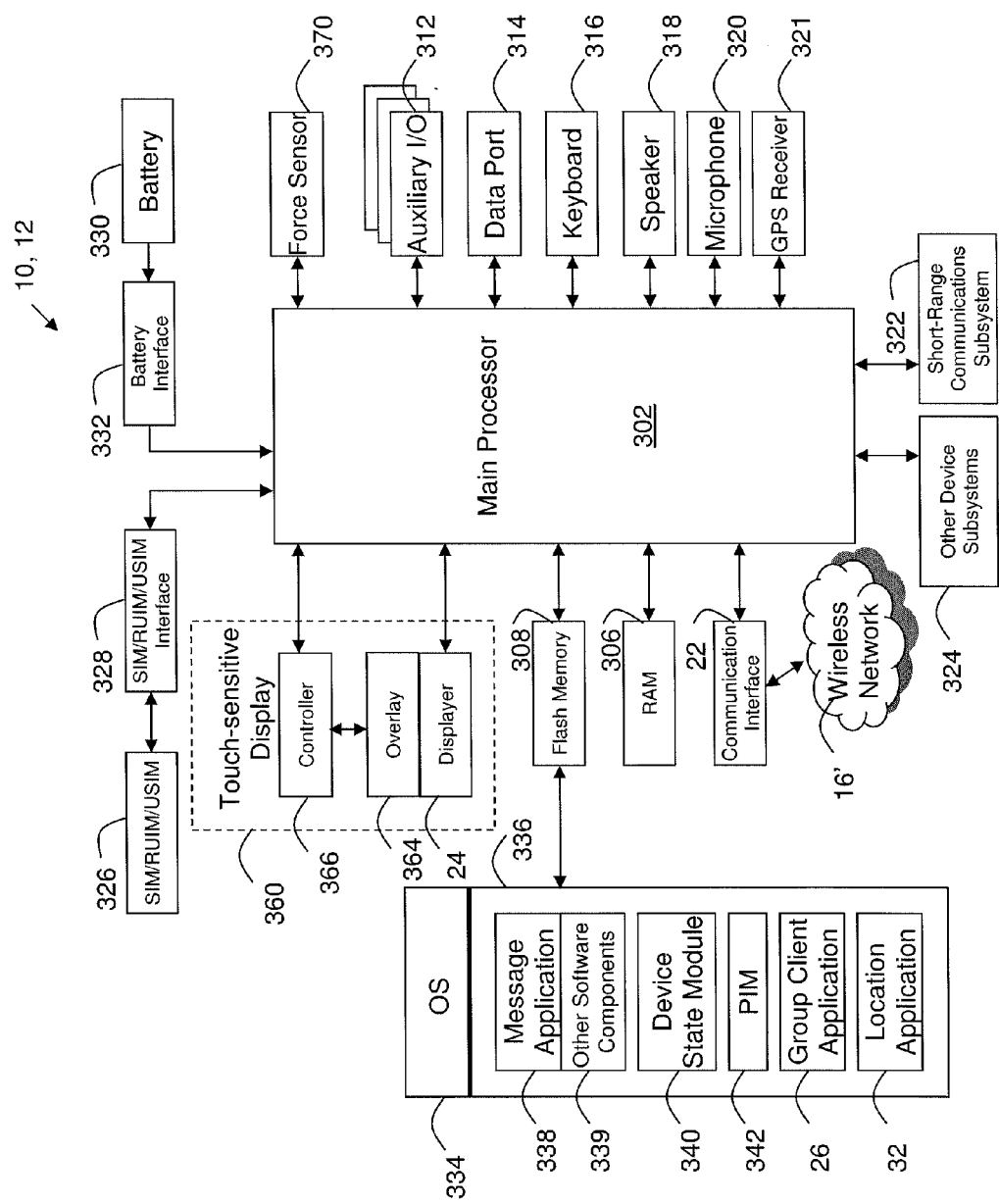
FIG. 13 is an example of a configuration for a mobile device.

Referring to FIG. 13, to further aid in the understanding of the example proximate and contact devices 10, 12 described above, shown therein is a block diagram of an example configuration of a proximate device 10 configured as a "mobile device", referred to commonly as "mobile device 10". It can be appreciated that a contact device 12, configured to operate as a mobile device, may have a similar configuration. The mobile device 10 includes a number of components such as a main processor 302 that controls the overall operation of the mobile device 10. Communication functions, including data and voice communications, are performed through a communication interface 22. The communication interface 22 receives messages from and sends messages to a wireless network 16'. In this example of the mobile device 10, the communication interface 22 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 22 with the wireless network 16' represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications subsystem 322, and other device subsystems 324. Some of the subsystems of the mobile device 10 perform communication-related functions, whereas other subsystems may provide "resident" or on-device functions. By way of example, the touch-sensitive display 360 and the keyboard 316 may be used for both communication-related functions, such as entering a text message for transmission over the wireless network 16', and device-resident functions such as a calculator or task list. In one example, the mobile device 10 can include a non touch-sensitive display in place of, or in addition to the touch-sensitive display 360. For example the touch-sensitive display 360 can be replaced by a displayer 24 that may not have touch-sensitive capabilities.

The mobile device 10 can send and receive communication signals over the wireless network 16' after required network registration or activation procedures have been completed. Network access is associated with a subscriber or user of the mobile device 10. To identify a subscriber, the mobile device 10 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 26, and 32. The operating system 334 and the software components 336 to 342, 26, and 32, that are executed by the main processor 302 are typically stored in a persistent store such as the flash memory 308, which may alternatively be a read-only memory (ROM) or similar storage element (not shown).

Those skilled in the art will appreciate that portions of the operating system 334 and the software components 336 to 342, 26, and 32, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, a group client application 26, and a location application 32. A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 16'.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 16', the auxiliary I/O subsystem 312, the data port 314, the short-range communications subsystem 322, or any other suitable device subsystem 324.

The data port 314 can be any suitable port that enables data communication between the mobile device 10 and another computing device. The data port 314 can be a serial or a parallel port. In some instances, the data port 314 can be a Universal Serial Bus (USB) port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the displayer 24 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The displayer 24 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device 10, 12, server 16, P2P system 52, location service 50, etc., any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method, with an information processing system, of forming an electronic group, the method being performed by at least one information processing system and comprising:
   determining, by at least one processor of an information processing system, that a plurality of electronic devices satisfy at least one proximity criterion;
   accessing, based on the determining, a set of contact list information associated with at least one of the plurality of electronic devices, the set of contact list information comprising one or more communication-based electronic records identifying at least one individual as a contact of a user associated with the at least one of the plurality of electronic devices;
   selecting a plurality of candidate members for the electronic group, wherein at least a first candidate member of the plurality of candidate members is selected from the plurality of electronic devices satisfying the at least one proximity criterion, and at least a second candidate member of the plurality of candidate members is selected based on the set of contact list information, wherein the at least second candidate member is an electronic device associated with a contact of the user identified by the set of contact list information;
   determining if the plurality of candidate members satisfy a set of characteristics of at least one signature in a plurality of signatures, wherein the at least one signature is generated, at least in part, as a function of the set of characteristics, and wherein each signature in the plurality of signatures is a unique representation of an electronic group that has been previously formed;
   in response to determining that two or more of the plurality of candidate members satisfy the set of characteristics of the at least one signature,
      reforming the electronic group represented by the at least one signature with the at least two or more candidate members, and
      presenting data to the at least two or more candidate members in response to reforming the electronic group, the data having been previously associated with the electronic group prior to the electronic group being reformed, wherein at least a subset of the data was previously transmitted between members of the electronic group; and
   in response to determining that two or more of the plurality of candidate member fail to satisfy the set of characteristics of the at least one signature,
      forming the electronic group from the plurality of candidate members, and electronically transmitting a notification to a least one member of the electronic group that has been formed, the notification configured for presentation by the at least one member.

2. The method of claim 1, further comprising sending a notification to the plurality of candidate members to enable the candidate members to accept or decline entry into the electronic group.

3. The method of claim 2, the notification comprising an invitation to join the electronic group.

4. The method of claim 1, the at least one proximity criterion comprising a relative distance between respective ones of the plurality of electronic devices.

5. The method of claim 1, the at least one proximity criterion comprising a geographic area.

6. The method of claim 1, the plurality of candidate members comprising the plurality of electronic devices satisfying the at least one proximity criterion and a combination of contacts selected from the plurality of electronic devices satisfying the at least one proximity criterion.

7. The method of claim 6, the combination comprising a union of all contacts of the plurality of electronic devices satisfying the at least one proximity criterion.

8. The method of claim 6, the combination comprising an intersection of contacts common to the plurality of electronic devices satisfying the at least one proximity criterion.

9. The method of claim 1, further comprising receiving a request to create the electronic group, the request specifying the at least one proximity criterion and temporal information.

10. The method of claim 1, further comprising generating a signature for the electronic group.

11. The method of claim 1, further comprising detecting a group reformation event, wherein the electronic group has been previously formed.

12. The method of claim 11, further comprising determining a signature for the electronic group.

13. The method of claim 12, wherein the signature is determined subsequent to detecting that the plurality of electronic devices are associated with a location or identifier determinable from the signature.

14. A non-transitory computer readable storage medium comprising computer executable instructions for forming an electronic group, comprising instructions for:
   determining, by at least one processor of an information processing system, that a plurality of electronic devices satisfy at least one proximity criterion;
   accessing, based on the determining, a set of contact list information associated with at least one of the plurality of electronic devices, the set of contact list information comprising one or more communication-based electronic records identifying at least one individual as a contact of a user associated with the at least one of the plurality of electronic devices;
   selecting a plurality of candidate members for the electronic group, wherein at least a first candidate member of the plurality of candidate members is selected from the plurality of electronic devices satisfying the at least one proximity criterion, and at least a second candidate member of the plurality of candidate members is selected based on the set of contact list information, wherein the at least second candidate member is an electronic device associated with a contact of the user identified by the set of contact list information;
   determining if the plurality of candidate members satisfy a set of characteristics of at least one signature in a plurality of signatures, wherein the at least one signature is generated, at least in part, as a function of the set of characteristics, and wherein each signature in the plurality of signatures is a unique representation of an electronic group that has been previously formed;
   in response to determining that two or more of the plurality of candidate members satisfy the set of characteristics of the at least one signature,
      reforming the electronic group represented by the at least one signature with the at least two or more candidate members, and
      presenting data to the at least two or more candidate members in response to reforming the electronic group, the data having been previously associated with the electronic group prior to the electronic group being reformed, wherein at least a subset of the data was previously transmitted between members of the electronic group; and
   in response to determining that two or more of the plurality of candidate member fail to satisfy the set of characteristics of the at least one signature,
      forming the electronic group from the plurality of candidate members.

15. An electronic device comprising a processor, and at least one memory, the memory comprising computer executable instructions for causing the processor to form an electronic group by executing instructions to:
   determine that a plurality of electronic devices satisfy at least one proximity criterion;
   access, based on the determining, a set of contact list information associated with at least one of the plurality of electronic devices, the set of contact list information comprising one or more communication-based electronic records identifying at least one individual as a contact of a user associated with the at least one of the plurality of electronic devices;
   select a plurality of candidate members for the electronic group, wherein at least a first candidate member of the plurality of candidate members is selected from the plurality of electronic devices satisfying the at least one proximity criterion, and at least a second candidate member of the plurality of candidate members is selected from based on the set of contact list information, wherein the at least second candidate member is an electronic device associated with a contact of the user identified by the set of contact list information;
   determine if the plurality of candidate members satisfy a set of characteristics of at least one signature in a plurality of signatures, wherein the at least one signature is generated, at least in part, as a function of the set of characteristics, and wherein each signature in the plurality of signatures is a unique representation of an electronic group that has been previously formed;
   in response to determining that two or more of the plurality of candidate members satisfy the set of characteristics of the at least one signature,
      reform the electronic group represented by the at least one signature with the at least two or more candidate members, and
      present data to the at least two or more candidate members in response to reforming the electronic group, the data having been previously associated with the electronic group prior to the electronic group being reformed, wherein at least a subset of the data was previously transmitted between members of the electronic group; and
   in response to determining that two or more of the plurality of candidate member fail to satisfy the set of characteristics of the at least one signature,
      form the electronic group from the plurality of candidate members, and
      electronically transmit a notification to a least one member of the electronic group that has been formed, the notification configured for presentation by the at least one member.

16. The method of claim 1, wherein the one or more communication-based electronic records are associated with at least one of an address book, one or more messaging environments, one or more social networking environments, or a combination thereof.

17. The method of claim 1, wherein reforming the electronic group further comprises:
   updating the at least one signature representing the electronic group that has been reformed, the at least one signature being updated as a function of one or more characteristics of at least the two or more candidate members.

18. The non-transitory computer readable storage medium of claim 14, wherein reforming the electronic group further comprises:
  updating the at least one signature representing the electronic group that has been reformed, the at least one signature being updated as a function of one or more characteristics of at least the two or more candidate members.

19. The electronic device of claim 15, wherein reforming the electronic group further comprises:
  updating the at least one signature representing the electronic group that has been reformed, the at least one signature being updated as a function of one or more characteristics of at least the two or more candidate members.

* * * * *